United States Patent [19]
Bordeleau

[11] Patent Number: 5,694,662
[45] Date of Patent: Dec. 9, 1997

[54] GLOBAL FORCE BEARER WHEEL/SPHERE

[76] Inventor: Pierre G. Bordeleau, 19 Cartier Street, Kapuskasing, Ontario, Canada, P5N 2J7

[21] Appl. No.: 677,902

[22] Filed: Jul. 10, 1996

[51] Int. Cl.$^6$ .................................................. B60B 33/08
[52] U.S. Cl. .................................................. 16/25; 16/26
[58] Field of Search .................................. 16/24, 25, 26

[56] References Cited

U.S. PATENT DOCUMENTS

| | | | |
|---|---|---|---|
| 670,426 | 3/1901 | Henries | 16/26 |
| 2,367,603 | 4/1945 | Stwewart | 16/26 |
| 2,972,162 | 2/1961 | Townsend | 16/26 |

*Primary Examiner*—Daniel W. Howell
*Assistant Examiner*—Mark Williams

[57] ABSTRACT

The Global Force Caster, acting as a multi-directional unhindered wheel permits an object, i.e. furnitures, shopping carts, mobility aids etc., resting on the global Force Bearer's threaded casing or in bored hole in the object's body, with instantaneous movements at will in any direction upon a negligible external lateral force without the jerking movement or hinderance of delays due to a dispositioning of the wheel in relation to the direction of the external lateral force, commonly found in conventional wheels assemblies. Additionally, the "Bearer" is free of extra efforts needed when a change in direction is unavoidable when changing elevations, as opposed to the typical wheel assemblies.

1 Claim, 3 Drawing Sheets

GLOBAL FORCE BEARER WHEEL/SPHERE

SUMMARY OF THE INVENTION

A Global Force Caster has the force or weight of an object, which bears upon it, transmitted globally or absorbed uniformly by acting on a threaded flanged (2) casing (3) comprising of a ball bearing ring (4) or serrated ring (5) resting on the sphere, secured in the casing by a ring, which permits an instantaneous unhindered direction at will upon subjection to a negligible external lateral force.

Also, disclosed in this patent application is the ring manipulating tool as shown in FIG. (6).

DETAILED DESCRIPTION

Figure 1:
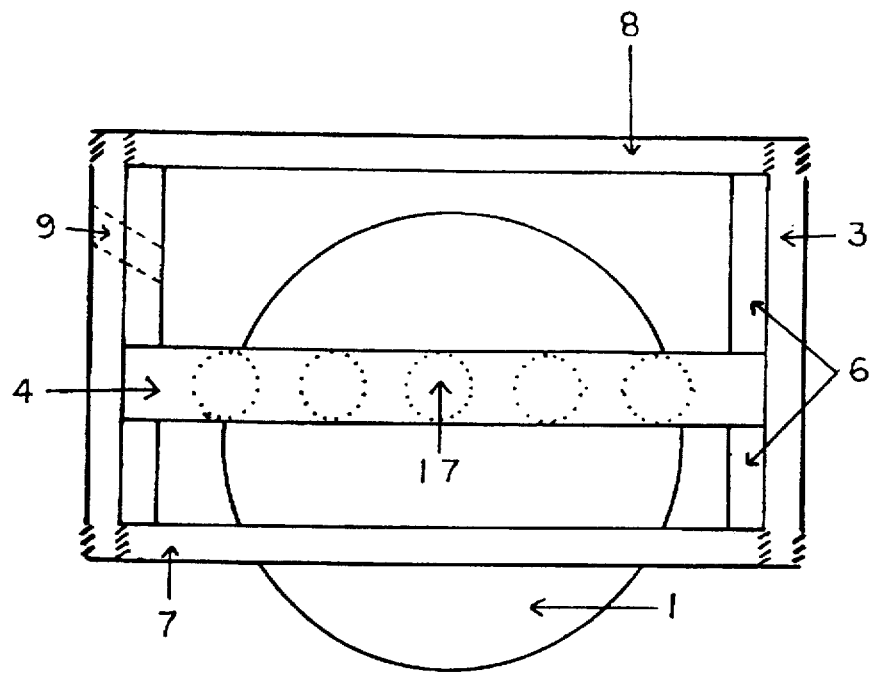
FIG. 1 is a side view of the preferred embodiment of the encased Global Force Caster with a ball bearing ring.
Figure 2:
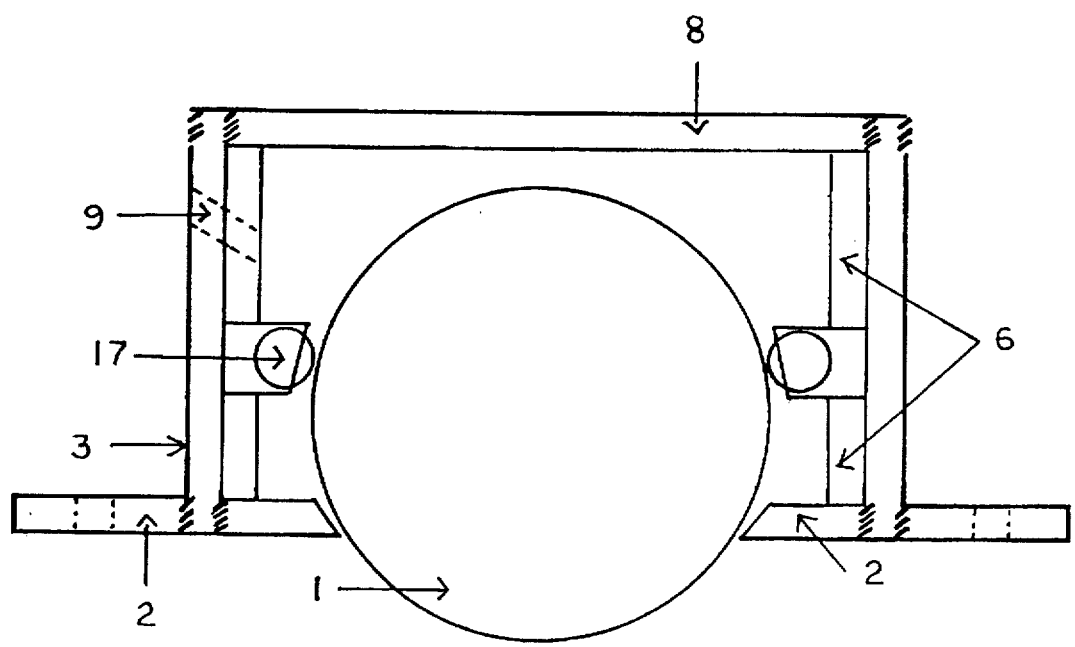
FIG. 2 is a cross section view of FIG. 1.
Figure 3:
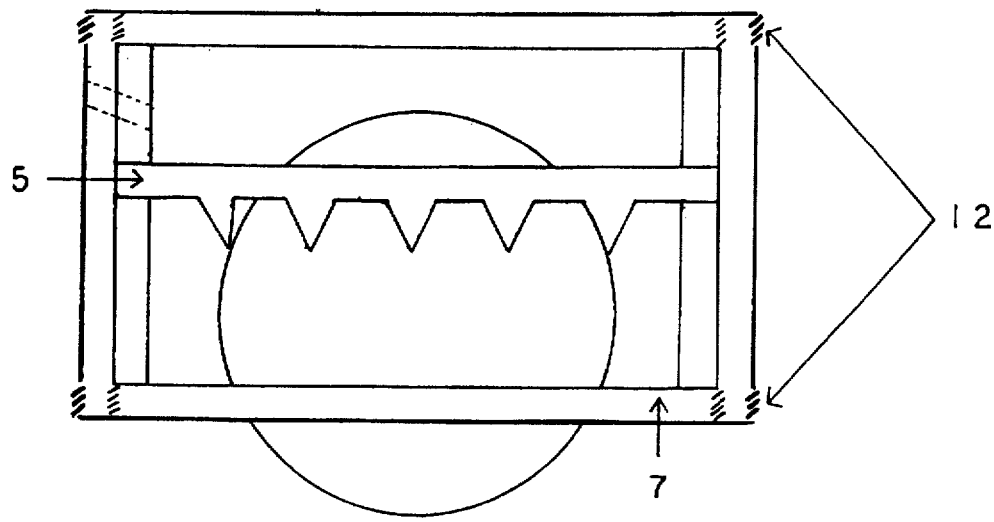
FIG. 3 is an embodiment of the caster having a serrated ring.
Figure 4:
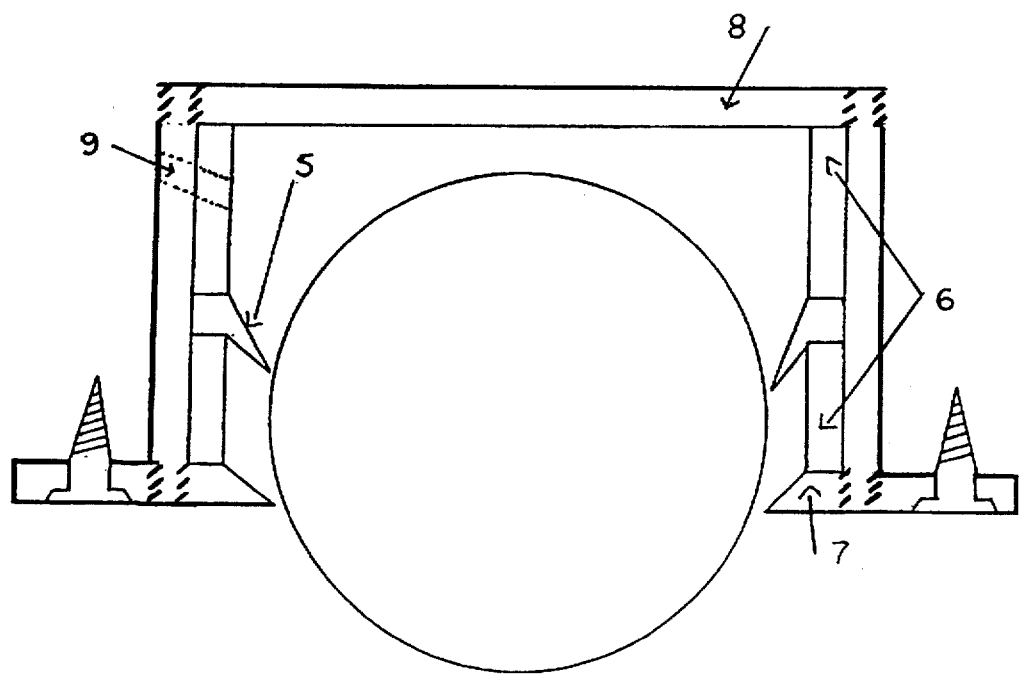
FIG. 4 is a cross section view of FIG. 3.
Figure 5:
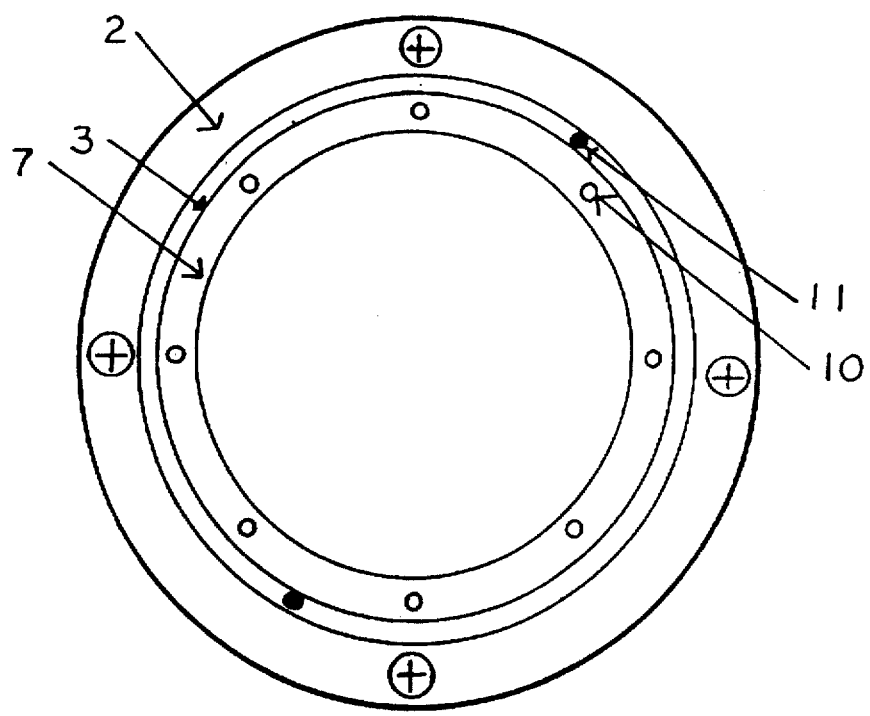
FIG. 5 is a top view of the securement skimming ring threaded to the casing.

The Global Force Caster acting as a unhindered wheel is accomplished by securing a hollow or solid sphere (1) fabricated of a rubber outer shell high density material within a threaded flanged (2) casing (3) comprising of a 45 degree ball bearing ring (4) which can accomodate a number of balls according to the diameter of the Caster's Sphere and the difference in densities of the contact and core material, or excluding the rubber outer shell and, utilizing 45° serrated ring (5-FIG. 3) as the force transmitter to the Caster's Sphere, which lies between two cylindrical spacers (6), the securment ring (7), which doubles as a debris skimming component, and the threaded casing cover (8).

In regards to high probabilities of the sphere's subjection to substances with adhesive properties, the threaded casing is accomodated with a water solution inflow plugged port (9) which then gets expelled by perforations (10) in the securing/skimming ring.

Figure 6:
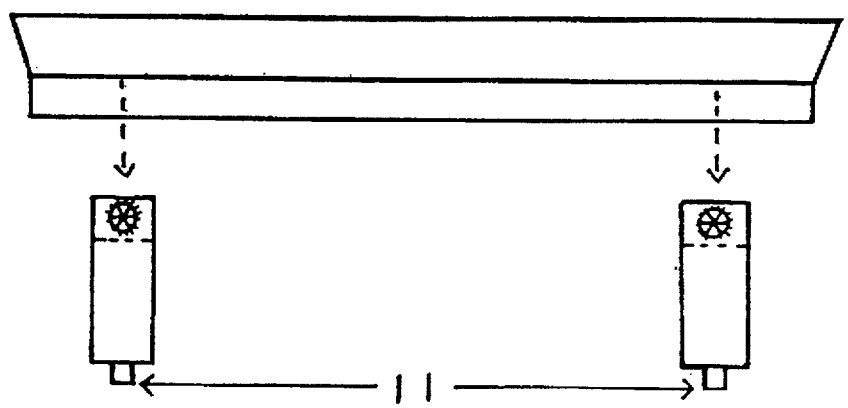
FIG. 6 shows the securement skimming ring tool.

The threaded cover, flange and skimming ring are easily removable by the disclosed tool (FIG. 6).

The Global Force Caster can also be fitted with a bottom ball bearing ring by reducing the height of the bottom spacer, although, this would reduce the travelling height area.

I claim:

1. A caster comprising a sphere, a bearing ring or serrated ring which fits circumferentially around a portion of the sphere, a casing for supporting the bearing ring or serrated ring, a pair of spacers within the casing and located on both sides of the bearing ring or serrated ring, and a securement skimming ring having threads on its outer diameter to secure it to the casing, said securement skimming ring locking said spacers in place within the casing.

* * * * *